United States Patent [19]

Yoshida et al.

[11] Patent Number: 4,983,660

[45] Date of Patent: Jan. 8, 1991

[54] POLYETHYLENE TEREPHTHALATE RESIN COMPOSITION

[75] Inventors: Tomohiko Yoshida; Ryoji Handa; Noriyuki Tajiri; Hitochi Iwasaki, all of Toyohashi; Mituto Yoshihiro, Yokohama, all of Japan

[73] Assignee: Mitsubishi Rayon Company Ltd., Tokyo, Japan

[21] Appl. No.: 289,131

[22] Filed: Dec. 23, 1988

[30] Foreign Application Priority Data

Dec. 25, 1987 [JP] Japan .................................. 62-331701
Feb. 8, 1988 [JP] Japan .................................. 63-27282
Mar. 16, 1988 [JP] Japan .................................. 63-62285

[51] Int. Cl.$^5$ .......................... C08L 67/02; C08K 3/34; C08K 3/26
[52] U.S. Cl. .................................... 524/369; 524/372; 524/375; 524/410; 524/425; 524/451; 524/456; 524/505; 524/513; 524/605
[58] Field of Search ................ 524/605, 513, 369, 372, 524/375, 451, 505, 425

[56] References Cited

U.S. PATENT DOCUMENTS

| | | | |
|---|---|---|---|
| 3,085,987 | 4/1963 | Abashian | 524/372 |
| 4,344,874 | 8/1982 | Akagi et al. | 524/513 |
| 4,351,751 | 9/1982 | Kishida et al. | 524/375 |
| 4,548,978 | 10/1985 | Garrison | 524/605 |
| 4,659,757 | 4/1987 | Okamoto et al. | 524/513 |
| 4,753,980 | 6/1988 | Deyrup | 524/369 |
| 4,806,588 | 2/1989 | Fujimoto et al. | 524/505 |

Primary Examiner—Lewis T. Jacobs
Attorney, Agent, or Firm—Finnegan, Henderson, Farabow, Garrett & Dunner

[57] ABSTRACT

A highly crystalline polyethylene terephthalate resin composition comprising (A) 100 parts by weight of a polyethylene terephthalate copolymer comprising ethylene terephthalate units as the main recurring units, which is formed by copolymerizing a glycol component containing 1 to 20% by weight of a polyalkylene glycol having an average molecular weight of 500 to 20,000 and 1.2 to 15% by weight of diethylene glycol with a carboxylic acid component composed mainly of terephthalic acid, (B) 5 to 200 parts by weight of a fibrous reinforcer, (C) 0.5 to 130 parts by weight of a nucleating agent, and (D) 0.1 to 60 parts by weight of a crystallization-promoting agent. The resin composition optionally contains 2 to 100 parts by weight of an inorganic compound, 2 to 100 parts by weight of an impact strength improver, 2 to 40 parts by weight of a flame retardant, or 1 to 20 parts by weight of a flame retardant assistant. The resin composition has an improved impact strength, a high heat distortion temperature, and an excellent moldability, and gives a molded article having a good surface appearance even when molding is carried out at a low mold temperature.

12 Claims, No Drawings

POLYETHYLENE TEREPHTHALATE RESIN COMPOSITION

BACKGROUND OF THE INVENTION

1. Field of the Invention

This invention relates to a fiber-reinforced polyethylene terephthalate resin composition having excellent mechanical characteristics, high heat resistance, and high chemical resistance, which is widely used for various heating device such as electronic ranges, electromagnetic cookers and irons electric parts such as connectors and coil bobbins, and automobile parts such as reflectors.

2. Description of the Related Art

The characteristics of a crystalline polymer such as a polyethylene terephthalate resin depend greatly on the degree of crystallization. Accordingly, if a high heat resistance is desired, a crystal nucleating agent such as a metal salt of an organic carboxylic acid or an inorganic compound must be added and molding must be carried out under a mold temperature having a high level of 130° to 140° C.

Alternately, a method can be adopted in which a molded article obtained at a low mold temperature not exceeding 100° C. is subjected to a post heat treatment or a similar post treatment for promoting and advancing the crystallization, whereby the heat resistance is increased.

However, in view of the operation stability and from the economical viewpoint, use of a high-temperature mold or post treatment is not preferred. If molding is carried out by using a low-temperature mold maintained at a temperature lower than 100° C., the crystallization of the resin is not sufficiently advanced, and thus the release property is degraded. To enhance the release property, cooling must be slow, and therefore, a long time is required for cooling.

As a means of overcoming this disadvantage while carrying out the molding at a low mold temperature, a method is known of using a crystallization-promoting agent, and various crystallization-promoting agents are known.

For example, Japanese Examined Patent Publication No. 45-26225 proposes a method in which an ionic copolymer comprising an α-olefin and a salt of an α,β-unsaturated carboxylic acid is added to polyethylene terephthalate. Furthermore, Japanese Examined Patent Publication No. 47-3027 proposes a method in which a polyalkylene glycol is used in combination with an inorganic filler such as talc. Moreover, a combined use of an ionic copolymer, a polyalkylene glycol type compound, and an inorganic filler is known from Japanese Unexamined Patent Publication No. 5922985.

Still further, a method is known in which polyethylene terephthalate is copolymerized with soft segments and a crystallization-promoting agent is incorporated, whereby the crystallization speed is improved. For example, Japanese Unexamined Patent Publication No. 56-55451 proposes a method in which an ionomer is added to a copolymer of polyethylene terephthalate with a polyalkylene glycol, and Japanese Unexamined Patent Publication No. 60-223856 proposes a method in which an ionomer and a polyalkylene glycol are added to a copolymer of polyethylene terephthalate with a polyalkylene glycol.

When these known polyethylene terephthalate resin compositions are injection-molded in a mold maintained at a relatively low temperature, for example, at about 80° C., by using a hot water circulation type temperature-adjusting apparatus, which is advantageous from the economical viewpoint, the release property and mechanical strength are good, but the resulting molded articles do not have a completely satisfactory appearance.

SUMMARY OF THE INVENTION

A primary object of the present invention is to provide a highly crystalline polyethylene terephthalate resin composition having an excellent moldability and giving a molded article having an improved impact strength, a high heat distortion temperature, and a good surface appearance even when molding is carried out at a low mold temperature.

In accordance with the present invention, there is provided a polyethylene terephthalate resin composition comprising (A) 100 parts by weight of a polyethylene terephthalate copolymer comprising ethylene terephthalate units as the main recurring units, which is formed by copolymerizing a glycol component containing 1 to 20% by weight, based on the weight of the copolymer, of a polyalkylene glycol having an average molecular weight of 500 to 20,000 and 1.2 to 15% by weight, based on the weight of the copolymer, of diethylene glycol with a carboxylic acid component composed mainly of terephthalic acid, (B) 5 to 200 parts by weight of a fibrous reinforcer, (C) 0.5 to 130 parts by weight of a nucleating agent, and (D) 0.1 to 60 parts by weight of a crystallization-promoting agent.

DESCRIPTION OF THE PREFERRED EMBODIMENTS

The main constituent of the polyethylene terphthalate copolymer (A) is polyethylene terphthalate having ethylene terphthalate units as the main recurring units. This polyethylene terphthalate is obtained from a dicarboxylic acid component comprising at least 90 mole %, based on the dicarboxylic acid, of terphthalic acid and a glycol component comprising at least 90 mole %, based on the diol component other than the polyalkylene glycol and diethylene glycol, of ethylene glycol by direct esteification or by ester exchange and subsequent polycondensation.

As the dicarboxylic acid occupying up to 10 mole % of the dicarboxylic acid component, there can be mentioned, for example, phthalic acid, isophthalic acid, adipic acid, sebacic acid, naphthalene1,4-dicarboxylic acid, naphthalene-2,6-dicarboxylic acid, and diphenylether-4,4'-dicarboxylic acid.

As the diol occupying up to 10 mole % of the glycol component other than the polyalkylene glycol and diethylene glycol, there can be mentioned, for example, glycols such as propylene glycol, butylene glycol, neopentyl glycol, cyclohexanedimethanol, and 2,2-bis(4-hydroxyphenyl)propane.

As the component to be further copolymerized, there can be mentioned for example, hydroxy acids such as p-methoxybenzoic acid, p-hydroxybenzoic acid and p-hydroxyethoxy-benzoic acid.

As the polyalkylene glycol component, there can be mentioned, for example, polyethylene glycol, polypropylene glycol, polytetramethylene glycol, and an ethylene oxide/propylene oxide copolymer. The polyalkylene glycol component has a molecular weight of 500 to 20,000, preferably 1,000 to 6,000.

If the molecular weight of the polyalkylene glycol is lower than 500, the release property is poor when a low-temperature mold is used, and the heat resistance of the resulting molded article is degraded. If the molecular weight of the polyalkylene glycol is higher than 20,000, the residence stability at the molding step is degraded.

The amount of the polyalkylene glycol copolymerized depends on the average molecular weight, but to attain the intended object of the present invention, the polyalkylene glycol must be present in an amount of 1 to 20% by weight, preferably 2 to 15% by weight, in the polyethylene terephthalate copolymer.

If the amount of the polyalkylene glycol component copolymerized is smaller than 1% by weight, the crystallization-promoting effect is not prominent, and if the amount of the polyalkylene glycol component copolymerized exceeds 20% by weight, the residence stability at the molding step is degraded.

The polyethylene terephthalate copolymer used in the present invention is copolymerized with a diethylene glycol component (hereinafter referred to as "DEG") as well as the above-mentioned polyalkylene glycol component. The amount of DEG copolymerized is 1.2 to 15% by weight, preferably 1.5 to 10% by weight. If the amount of DEG copolymerized is smaller than 1.2% by weight, the appearance of the molded article is unsatisfactory when molding is carried out at a low mold temperature. If the amount copolymerized of DEG exceeds 15% by weight, the melting point of the polyethylene terephthalate copolymer is drastically lowered.

In the case of a copolymer comprising only polyethylene terephthalate and a polyalkylene glycol, a sufficiently high crystallinity is not attained. From Japanese Examined Patent Publication No. 43-13074, it is known that, in a copolymer comprising only polyethylene terephthalate and DEG, the rate of crystallization is reduced with an increase of the proportion of DEG. However, one of the most characteristic features of the present invention is that, by copolymerizing polyethylene terephthalate with a polyalkylene glycol having a specific molecular weight and DEG, highly crystalline polyethylene terephthalate copolymer can be unexpectedly obtained.

As the fibrous reinforcer (B), there can be mentioned a glass fiber, inorganic fibers other than a glass fiber, a carbon fiber, and heat-resistant organic fibers. More specifically, there can be mentioned a chopped strand of a glass fiber or carbon fiber having a diameter of 1 to 20 µm and a length smaller than 10 mm, a milled glass fiber, a pitch type carbon fiber, an aromatic polyamide fiber, an aromatic polyimide fiber, an aromatic polyamide-imide fiber, and mixtures thereof. Among the above, a chopped strand of a glass fiber is especially preferred.

The amount of the fibrous reinforcer incorporated is 5 to 200 parts by weight per 100 parts by weight of the polyethylene terephthalate copolymer [component (A)]. If the amount of the fibrous reinforcer is smaller than 5 parts by weight, the effect of reinforcing the molded article by the fibrous reinforcer is poor, and if the amount of the fibrous reinforcer is larger than 200 parts by weight, the flow processability is degraded.

As the nucleating agent (C), there can be used talc and a sodium or potassium salt of an olefin/acrylic acid or methacrylic acid copolymer. The olefin occupies 50 to 98% by weight, preferably 80 to 98% by weight, of the copolymer, and at least 30% of the total carboxylic acid residue in the copolymer is neutralized with sodium or potassium. A sodium salt of an ethylene/methacrylic acid copolymer is especially preferred.

The foregoing nucleating agents can be used singly or in the form of a mixture of two or more thereof. The nucleating agent is incorporated in an amount of 0.5 to 130 parts by weight per 100 parts by weight of the polyethylene terephthalate copolymer (A). If the amount of the nucleating agent is smaller than 0.5 part by weight, the nucleating effect is poor, and if the amount of the nucleating agent is larger than 130 parts by weight, the strength of the resulting molded article is low.

An ether compound represented by the following general formula [I] or a polyester type elastomer is incorporated as the crystallization-promoting agent (D) in the polyethylene terephthalate resin composition of the present invention:

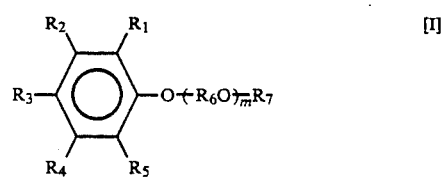

In the above general formula [I], $R_1$ through $R_5$ independently represent a hydrogen arom or a hydrocarbon group. The carbon number of the hydrocarbon group is not particularly limited, but a hydrocarbon group having 3 to 30 carbon atoms is especially preferred. In the formula [I], $R_6$ represents an alkylene group having 2 to 6 carbon atoms, and an ethylene group, a propylene group, a butylene group and a neopentylene group are preferred. In the formula [I], the alkylene oxide $-R_6)_m$ may be either an alkylene oxide units consisting of one kind of alkylene groups or an alkylene oxide copolymer structure consisting of different kinds of alkylene oxide units, and the average recurring number m of these alkylene oxide units is in the range of from 20 to 150. If an ether compound in which m is smaller than 20 is used, the mechanical strength of the resulting molded article is degraded or the appearance-improving effect is poor. On the other hand, if an ether compound in which m exceeds 150 is used, the heat resistance of the final resin composition is degraded. In the formula [I], $R_7$ represents a hydrogen atom or a hydrocarbon group containing a benzene ring and having 6 to 12 carbon atoms.

As seen from the general formula [I], in the ether compound used in the present invention, at least one end of the polyalkylene oxide must be an aromatic hydrocarbon group. If the ether compound having this specific structure is incorporated, a resin composition having an excellent heat resistance and mechanical strength, and having well-balanced characteristics, can be obtained. On the other hand, if an ether compound consisting of the same polyalkylene oxide chain in which both the ends are aliphatic hydrocarbon and/or hydroxyl groups is incorporated, the heat resistance is little improved or the mechanical strength is drastically degraded, and it become difficult to obtain a resin composition having well-balanced characteristics.

As specific examples of the ether compound used in the present invention, there can be mentioned polyoxyethylene monononylphenyl ether, polyoxyethylene mono-octylphenyl ether, polyoxyethylene dinonylphenyl ether, and polyoxyethylene dioctylphenyl ether, in each of which the total number of alkylene oxide recurring units is in the range of from 20 to 150.

As the polyester elastomer used as the crystallization promoting agent in the present invention, there can be mentioned, for example, an aromatic polyester/alkylene glycol block copolymer (except a copolymer in which a polyethylene terephthalate is the aromatic polyester component) and an aromatic polyester/polylactone block copolymer.

As the aromatic polyester/polyalkylene glycol block copolymer, there can be mentioned an aromatic polyester/polyether block copolymer which comprises soft segments composed of a residue of a polyalkylene glycol such as polytetramethylene glycol, polyethylene glycol, polypropylene glycol, a polyethylene glycol/polypropylene glycol block copolymer or a polyhydric alcohol/alkylene oxide adduct, and hard segments composed of a residue of an aromatic polyester such as polybutylene terephthalate, polyethylene naphthalate, polybutylene terephthalate/adipate or polybutylene terephthalate/isophthalate. This block copolymer is an aromatic polyester/polyalkylene glycol block copolymer having a glass transition temperature lower than 10° C., preferably a glass transition temperature of $-15°$ to $-60°$ C., and a molecular weight of at least 10,000, preferably at least 30,000, which is formed by using a polyalkylene glycol having a molecular weight of at least 650, preferably 800 to 6,000, so that the proportion of the polyalkylene glycol portion is at least 20% by weight, preferably 30 to 80% by weight.

The aromatic polyester/polylactone block copolymer is an elastic polymer which comprises hard segments composed of a crystalline aromatic polyester and soft segments of a polylactone, in which the hard segment/soft segment block copolymerization weight ratio is from 20/80 to 90/10. This copolymer can be prepared, for example, by a process in which a lactone is polymerized by using a crystalline aromatic polyester having a relatively low molecular weight of 500 to 5,000 as the initiator and the chain is extended by a polyfunctional acylating agent to form a block copolymer having a high degree of polymerization, and a process in which a crystalline aromatic polyester having a relatively high molecular weight (preferably a molecular weight of at least 5,000) and a lactone are heated, melted, and reacted to form a block copolymer. As preferred examples of the crystalline aromatic polyester, there can be mentioned homopolyesters such as polyethylene terephthalate, polybutylene terephthalate, polypropylene terephthalate, poly-1,4-cyclohexylenedimethylene terephthalate, and polyethylene-2,6-naphthalate; polyester ethers such as polyethylene hydroxybenzoate and poly-p-phenylene bishydroxyethoxyterephthalate, and copolyesters and copolyester ethers comprising alkylene terephthalate units as the main units and up to 20 mole % of comonomer units such as ethylene isophtalate units, ethylene adipate units 1,4-cyclohexylenedimethylene terephthalate units or ethylene-p-hydroxybenzoate units. Polybutylene terephthalate is especially preferred.

ε-Caprolactone is especially preferred as the lactone, but enantholactone and caprolactone can be used. Furthermore, a mixture of at least two lactones can be used.

Preferably, the hard segment/soft segment copolymerization weight ratio in the copolymer is from 40/60 to 80/20, and that the melting point of the copolymer is higher than 170° C.

In the present invention, the crystallization-promoting agent (D) must be incorporated in an amount of 0.1 to 60 parts by weight based on 100 parts by weight of the poly ethylene terephthalate copolymer. If the amount of the component (D) is smaller than 0.1 part by weight, there is little improvement of the heat resistance and appearance of the molded article. If the amount of the component (D) exceeds 60 parts by weight, the molecular weight of the polymer is reduced.

In the present invention, to reduce the warp of the resulting molded article, an inorganic compound can be added to the composition comprising the above-mentioned components (A) to (D). As the inorganic compound, there can be mentioned wollastonite, mica silicic acid silicic acid salts, and calcium carbonate. The inorganic compound can be incorporated in an amount of 2 to 100 parts by weight per 100 parts by weight of the polyethylene terephthalate copolymer. If the amount of the inorganic compound is smaller than 2 parts by weight a reduction of the warp of the molded article is not substantially attained, and if the amount of the inorganic compound exceeds 100 parts by weight, the strength of the molded article is reduced.

Moreover, in the present invention, if an impact strength improver is further incorporated, a polyethylene terephthalate resin having a much improved impact strength is obtained. As the impact strength improver, at least one member selected from (i) polystyrene resins containing a diene type resin, (ii) copolymers comprising 70 to 99.5% by weight of an α-olefin, 2 to 20% by weight of glycidyl methacrylate and up to 30% by weight of vinyl acetate, and (iii) unsaturated acid-modified polyolefins is used.

The polystyrene resin containing a diene type resin is a homopolymer or copolymer comprising an aromatic vinyl compound as one main component, such as polystyrene, a styrene/acrylonitrile copolymer, an α-methylstyrene/acrylonitrile copolymer, a styrene/acrylonitrile/methyl methacrylate copolymer or a phenylmaleimide/styrene/acrylonitrile, which is reinforced with a rubber component. For example, there can be mentioned high-impact polystyrene, an acrylonitrile/butadiene/styrene copolymer, and a methyl methacrylate/butadiene/styrene copolymer. The polystyrene resin of this type can be prepared by emulsion polymerization, emulsion-suspension polymerization, suspension polymerization, bulk polymerization or the like.

In the α-olefin/glycidyl methacrylate/vinyl acetate copolymer, the glycidyl methacrylate content is 2 to 20% by weight. If the glycidyl methacrylate content is lower than 2% by weight, there is little improvement of the impact strength. If the glycidyl methacrylate content is higher than 20% by weight, the softness of the copolymer per se is lost. As the α-olefin in the copolymer, there can be mentioned ethylene and propylene. If the vinyl acetate content in the copolymer exceeds 30% by weight, the heat stability is lost. Preferable α-olefin/glycidyl methacrylate/vinyl acetate compolymers are commercially available in the trade name of Bond Fast E, Bond Fast 2B, and Bond Fast 7B (supplied by Sumitomo Chemical).

The unsaturated acid-modified polyolefin as the other component for improving the impact resistance of the polyethylene terephthalate resin composition of the present invention is a polymer obtained by grafting 0.05 to 3.0% by weight of an α,β-unsaturated carboxylic acid or a derivative thereof to an ethylene polymer such as a homopolymer of ethylene or a copolymer of ethylene with an α-olefin having at least 3 carbon atoms. In general, a modified ethylene polymer having a melt index (hereinafter referred to as "MI") of 0.01 to 50 is used. A modified ethylene polymer of the copolymer type is preferable. As the α-olefin having at least 3 carbon atoms as the comonomer, there can be mentioned propylene, butene-1, hexene-1, decene-1, 4-methylbutene-1 and 4-methylpentene-1. Among them, propylene and butene-1 are especially preferred.

As the α,β-unsaturated carboxylic acid or derivative thereof (hereinafter referred to collectively as "α,β-unsaturated carboxylic acid") to be graft-polymerized to the unmodified ethylene polymer, there can be mentioned acrylic acid, methacrylic acid, ethacrylic acid, maleic acid and fumaric acid, and esters, anhydrides and imides thereof. Among the above, maleic anhydride and maleic acid imide are especially preferred. If the amount of the α,β-unsaturated carboxylic acid to be graft-polymerized to the unmodified ethylene polymer is too small, it is difficult to attain the intended object, and if the amount of the α,β-carboxylic acid is too large, the obtained polyester resin composition is colored and the appearance characteristic is degraded.

The above-mentioned impact strength improver is incorporated in an amount of 2 to 100 parts by weight per 100 parts by weight of the polyethylene terephthalate copolymer. If the amount of the impact strength improver is smaller than 2 parts by weight, there is little improvement of the impact strength of the molded article, and if the amount of the impact strength improver is larger than 100 parts by weight, the heat resistance of the molded article is reduced and the moldability is degraded.

To render the polyethylene terephthalate resin composition of the present invention flame-retardant, a flame retardant and a flame retardant assistant can be incorporated in the composition comprising the above-mentioned components (A) through (D).

A polymeric bromine-containing flame retardant is generally used as the flame retardant. For example, there can be mentioned pentabromobenzyl polyacrylate, pentabromobenzyl polymethacrylate, polytetrabromoxylylene bisacrylate polytetrabromoxylylene bismethacrylate, brominated polycarbonate, poly(2,4,6-tribromo)styrene, poly (2,4,5-tribromo)styrene, and brominated crosslinked polystyrene.

An antimony compound is preferably used as the flame retardant assistant. For example, there can be mentioned antimony trioxide, antimony pentoxide, and sodium antimonate.

Preferably, the flame retardant is incorporated in an amount of 2 to 40 parts by weight per 100 parts by weight of the polyethylene terephthalate resin. If the amount of the flame retardant is smaller than 2 parts by weight, it is impossible to impart a sufficient flame retardancy to the polyethylene terephthalate resin composition. If the amount of the flame retardant exceeds 40 parts by weight, the strength of the resulting molded article is degraded.

Preferably, the flame retardant assistant is incorporated in an amount of 1 to 20 parts by weight per 100 parts by weight of the polyethylene terephthalate copolymer. If the amount of the flame retardant assistant is smaller than 1 part by weight, it is impossible to impart a sufficient flame retardancy to the polyethylene terephthalate resin composition, and incorporation of the flame retardant assistant in an amount exceeding 20 parts by weight results in a degradation of the strength of the molded article.

Known additives such as heat stabilizer, a dye and a pigment can be further added to the polyethylene terephthalate resin composition of the present invention, if desired.

A known method can be adopted for preparing a molded article from the polyethylene terephthalate resin composition of the present invention. For example a method can be adopted in which predetermined amounts of the respective components are charged into an appropriate kneader such as an extruder, the mixture is melt-kneaded and pelletized, and the pellets are subjected to injection molding or compression molding to obtain a molded article. The polyethylene terephthalate resin composition of the present invention is characterized in that molding can be effected at a mold temperature lower than 80° C.

EXAMPLES

The present invention will now be described in detail with reference to the following examples.

EXAMPLES 1 THROUGH 8

A chopped strand glass fiber having a length of 3 mm (referred to as "GF" in the tales given hereinafter) and components (C), (D), (E), (F), (G) and (H) shown below were incorporated in amounts shown in Table 1 to a polyethylene terephthalate copolymer obtained by copolymerizing an ethylene terephthalate oligomer synthesized by the direct esterification with 5% by weight of polyethylene glycol (hereinafter referred to as "PEG") having an average molecular weight of 4,000 and 1.3% by weight of DEG (since 0.9% by weight of DEG was formed as the by-product, the content of copolymerized DEG was 2.2% by weight), and the composition was mixed and homogenized for 5 minutes in a V-blender. The obtained mixture was charged into a vent-type melt extruder having a diameter of 40 mm and extruded at a cylinder temperature of 260° to 280° C. to obtain a pellet of a resin composition according to the present invention.

With respect to the thus-obtained resin composition, the rate of crystallization was measured by using a differential scanning calorimeter (DSC), and a dumbbell specimen ASTM No. 1 was molded from the above pellet under the conditions of a cylinder temperature of 280° C., a mold temperature of 80° C., and a molding cycle of 30 seconds by using a 3-ounce (85-gram) screw type injection molding machine having a diameter of 32 mm, and the tensile strength test was carried out according to ASTM D-638. The Izod impact strength was measured according to ASTM D-256.

Note, a sample which had been melted and rapidly cooled in advance was used for the measurement of the rate of crystallization by the differential scanning calorimeter, and the test was carried out in a nitrogen gas current under the conditions of a temperature-elevating rate of 10° C./min, a retention time of 3 minutes at 280° C., and a temperature-lowering rate of 10° C./min. The crystallization temperature $Tc^+$ at the elevation of the temperature, the crystallization temperature $Tc^-$ at the lowering of the temperature, the glass transition temperature $Tg$ and the melting point $Tm$ were measured.

Note, a lower value of $Tc^+$ or a higher value of $Tc^-$ indicates a higher rate of crystallization.

The surface appearance of the molded article was evaluated with respect to a dumbbell specimen ASTM No. 1 molded at a mold temperature of 80° C.

The flame retardancy was evaluated according to the flame test of Underwriters, Laboratory Standard 94 (UL-94). Namely, the inflammability test was carried out by using a test piece having a size of 127 mm×12.7 mm×1.5 mm.

The molding warp was measured with respect to a flat square plate having a size of 110 mm×110 mm×2 mm, which was molded at a mold temperature of 80° C. The molding warp quantity (%) was calculated according to the following formula:

Warp quantity=[(height of warp)/(length of diagonal line)]×100

In the formula, "height of warp" means the height of the highest point (i.e., the center of the upper surface of the square plate) from the base plane on which the square plate is placed so that the convex surface thereof is upward.

The results of the measurements of the foregoing characteristics are shown in Table 1.

EXAMPLES 9 THROUGH 16

A pellet was prepared in the same manner as described in Examples 1 through 8 except that a polyethylene terephthalate copolymer prepared by copolymerizing an ethylene terephthalate oligomer formed by the direct esterification with 10% by weight of polytetramethylene glycol (hereinafter referred to as "PTMG") and 2.0% by weight of DEG (the amount copolymerized of DEG was 2.9% by weight) was used. The characteristics were evaluated in the same manner as described in Examples 1 through 8. The results are shown in Table 1.

COMPARATIVE EXAMPLES 1 THROUGH 5

A resin composition was prepared in the same manner as described in Examples 1 through 8 except that a homopolymer of polyethylene terephthalate or the polyethylene terephthalate copolymer used in Examples 1 through 8 was used as the base polymer and compounds shown in Table 2 were used as the additives. The characteristics were evaluated in the same manner as described in Examples 1 through 8. The results are shown in Table 2.

Abbreviations appearing in the tables are explained below.

Component (A)

(A-1): A polyethylene terephthalate/PEG/DEG copolymer having a copolymerized PEG amount of 5% by weight, a copolymerized DEG amount of 2.2% by weight, and a PEG average molecular weight of 4,000.

(A-2): A polyethylene terephthalate/PTMG/DEG copolymer having a copolymerized PTMG amount of 10% by weight, a copolymerized DEG amount of 2.9% by weight, and a PTMG average molecular weight of 1,000.

(A-3): Polyethylene terephthalate copolymer.

Component (C)

(C-1): An ethylene/methacrylic acid (weight ratio=85/15) copolymer in which 60% of methacrylic acid is neutralized with sodium.

(C-2): An ethylene/acrylic acid (weight ratio=85/15) copolymer in which acrylic acid is neutralized with potassium.

Component (D)

(D-1): Polyoxyethylene monononylphenyl ether.

(D-2): A polybutylene terephthalate/polytetramethylene glycol block copolymer in which the molecular weight of polyethylene glycol is 2,000, the butylene terephthalate/polyether molar ratio is 4/1, Tg is −58° C., and the molecular weight is 45,000.

Component (F)

(F-1): As ABS resin having a butadiene content of 60%.

(F-2): An ethylene/glycidyl methacrylate resin (Bond Fast E supplied by Sumitomo Chemical).

(F-3): An acid-modified ethylene/propylene rubber (Tufmer MP-0610 supplied by Mitsui Petroleum).

(F-4): A methyl methacrylate/butadiene/styrene copolymer (Metablene C223 supplied by Mitsubishi Rayon).

Component (G)

(G-1): Poly-(2,4,6-tribromo)-styrene (Pyrocheck 68 PB supplied by Nissan-Ferro).

(G-2): Brominated crosslinked polystyrene (EBR370FK supplied by Matsunaga Kagaku).

Component (H)

(H-1): Antimony trioxide supplied by Nippon Seiko.
(H-2): Sodium antimonate supplied by Nippon Seiko.

TABLE 1-1

| Example No. | A Kind | A Wt. parts | B Kind | B Wt. parts | C Kind | C Wt. parts | D Kind | D Wt. parts | E Kind | E Wt. parts | F Kind | F Wt. parts | G Kind | G Wt. parts | H Kind | H Wt. parts |
|---|---|---|---|---|---|---|---|---|---|---|---|---|---|---|---|---|
| 1 | A-1 | 100 | GF | 50 | Talc | 1 | D-1 | 3 | — | — | — | — | — | — | — | — |
| 2 | " | " | " | 55 | Talc | 2 | D-1 | 3 | — | — | — | — | — | — | — | — |
| 3 | " | " | " | " | C-1 | 4 | D-2 | 6 | — | — | — | — | — | — | — | — |
| 4 | " | " | " | " | Talc/C-2 | 2/4 | D-1/D-2 | 3/6 | — | — | — | — | — | — | — | — |
| 5 | " | " | " | 20 | Talc | 2 | D-1 | 3 | Wollastonite | 20 | — | — | — | — | — | — |
| 6 | " | " | " | " | " | " | " | " | Calcium carbonate | " | — | — | — | — | — | — |
| 7 | " | " | " | " | " | " | " | " | Mica | " | — | — | — | — | — | — |
| 8 | " | " | " | " | " | " | " | " | Hydrous silicic acid | 10 | — | — | — | — | — | — |
| 9 | A-2 | 100 | " | " | " | " | " | " | — | — | F-1 | 10 | — | — | — | — |
| 10 | " | " | " | 60 | " | " | " | " | — | — | F-1/ | 10/5 | — | — | — | — |

TABLE 1-1-continued

| Example No. | A Kind | A Wt. parts | B Kind | B Wt. parts | C Kind | C Wt. parts | D Kind | D Wt. parts | E Kind | E Wt. parts | F Kind | F Wt. parts | G Kind | G Wt. parts | H Kind | H Wt. parts |
|---|---|---|---|---|---|---|---|---|---|---|---|---|---|---|---|---|
| 11 | " | " | " | " | " | " | " | " | — | — | F-2 " | 10/10 | — | — | — | — |
| 12 | " | " | " | 40 | " | " | " | " | — | — | F-3 | 10 | — | — | — | — |
| 13 | " | " | " | " | " | " | " | " | — | — | F-4 | " | — | — | — | — |
| 14 | " | " | " | 60 | " | " | " | " | — | — | — | — | G-1 | 15 | H-1 | 8 |
| 15 | " | " | " | " | Talc/C-1 | 2/4 | D-1/D-2 | 3/6 | — | — | — | — | G-2 | 15 | H-1/H-2 | 2/6 |
| 16 | " | " | " | 40 | " | " | " | " | Wollastonite | 30 | — | — | G-1 | 15 | H-1 | 8 |

TABLE 1-2

| Example No. | Thermal analysis (°C.) Tg | Tc+ | Tm | Tc− | Tensile properties Strength (kg/cm²) | Elongation (%) | Izod impact strength Notched (kg·cm/cm) | Un-notched (kg·cm/cm) | Surface appearance | Flame retardancy (UL-94, 1/16″) | Warp quantity (mm) |
|---|---|---|---|---|---|---|---|---|---|---|---|
| 1 | 46 | 102 | 250 | 218 | 1450 | 4.5 | 9.0 | 47 | A | HB | 0.18 |
| 2 | 45 | 100 | 249 | 218 | 1400 | 4.6 | 9.1 | 48 | A | " | 0.18 |
| 3 | 43 | 88 | 249 | 218 | 1300 | 5.0 | 12.0 | 60 | A | " | 0.17 |
| 4 | 40 | 85 | 249 | 218 | 1200 | 5.1 | 12.2 | 66 | A | " | 0.16 |
| 5 | 45 | 98 | 250 | 219 | 1020 | 3.3 | 7.0 | 31 | A | " | 0.12 |
| 6 | 44 | 98 | 250 | 219 | 950 | 3.5 | 6.5 | 30 | A | " | 0.10 |
| 7 | 45 | 99 | 249 | 218 | 1000 | 3.8 | 7.0 | 35 | A | " | 0.08 |
| 8 | 44 | 100 | 250 | 218 | 970 | 4.0 | 6.8 | 32 | A | " | 0.10 |
| 9 | 46 | 101 | 251 | 217 | 1210 | 5.7 | 13.6 | 71 | A | " | 0.19 |
| 10 | 46 | 101 | 250 | 218 | 1100 | 6.0 | 16.1 | 72 | A | " | 0.22 |
| 11 | 45 | 100 | 251 | 217 | 1020 | 6.4 | 20.1 | 73 | A | " | 0.23 |
| 12 | 45 | 97 | 250 | 219 | 1050 | 5.9 | 16.5 | 70 | A | " | 0.18 |
| 13 | 44 | 96 | 250 | 219 | 1100 | 5.4 | 17.0 | 69 | A | " | 0.17 |
| 14 | 46 | 95 | 250 | 219 | 1250 | 5.0 | 8.0 | 42 | A | V-O | 0.20 |
| 15 | 40 | 90 | 249 | 218 | 1300 | 3.8 | 9.0 | 47 | A | " | 0.21 |
| 16 | 41 | 91 | 249 | 218 | 1000 | 4.5 | 7.0 | 35 | A | " | 0.09 |

TABLE 2-1

| Comparative Example No. | A Kind | A Wt. parts | B Kind | B Wt. parts | C Kind | C Wt. parts | D Kind | D Wt. parts | E Kind | E Wt. parts | F Kind | F Wt. parts | G Kind | G Wt. parts | H Kind | H Wt. parts |
|---|---|---|---|---|---|---|---|---|---|---|---|---|---|---|---|---|
| 1 | A-3 | 100 | GF | 50 | Talc | 1 | D-1 | 3 | — | — | — | — | — | — | — | — |
| 2 | A-1 | " | " | 250 | " | " | " | " | — | — | — | — | — | — | — | — |
| 3 | " | " | " | 50 | — | — | — | — | — | — | — | — | — | — | — | — |
| 4 | " | " | " | " | Talc | 150 | D-1 | 3 | — | — | — | — | — | — | — | — |
| 5 | " | " | " | " | " | 2 | " | 100 | — | — | — | — | — | — | — | — |

TABLE 2-2

| Example No. | Thermal analysis (°C.) Tg | Tc+ | Tm | Tc− | Tensile properties Strength (kg/cm²) | Elongation (%) | Izod impact strength Notched (kg·cm/cm) | Un-notched (kg·cm/cm) | Surface appearance | Flame retardancy (UL-94, 1/16″) |
|---|---|---|---|---|---|---|---|---|---|---|
| 1 | 70 | 115 | 255 | 218 | 1350 | 4.4 | 7.8 | 35 | C | HB |
| 2 | | | | | Impossible to extrude | | | | | |
| 3 | 65 | 113 | 251 | 218 | 1400 | 4.8 | 8.0 | 40 | C | " |
| 4 | 44 | 96 | 250 | 220 | 550 | 2.5 | 2.0 | 15 | A | " |
| 5 | 43 | 92 | 240 | 221 | 460 | 2.2 | 1.8 | 13 | A | " |
| 6 | 45 | 98 | 250 | 220 | 430 | 2.0 | 2.0 | 14 | A | " |
| 7 | — | — | — | — | Impossible to extrude | | — | — | — | — |
| 8 | 47 | 95 | 250 | 219 | 1260 | 5.0 | 8.1 | 44 | A | V-2 |
| 9 | 46 | 94 | 250 | 218 | 1250 | 4.8 | 7.8 | 42 | A | V-2 |

(Note 1)
Tg: Glass transition temperature (°C.)
Tc+: Crystallization temperature peak (°C.) at elevation of the temperature
Tm: Melting point (°C.)
Tc−: Crystallization temperature peak (°C.) at lowering of the temperature
(Note 2)
The surface appearance (mold temperature = 80° C.) was evaluated as follows.
A: good
B: slightly roughened surface
C: GF rising on the surface As apparent from Table 1, especially from the results obtained in Examples 1 through 4, if the components (C) and (D) are incorporated in the polyethylene terephthalate copolymer, a molded article having a surface gloss can be obtained even at a mold temperature of 80° C.

As seen from the results obtained in Examples 5 through 8, if the component (E) is added to the components (A) through (D), the warp quantity is reduced.

As seen from the results obtained in Examples 9 through 13, if the component (F) is added to the components (A) through (D), the Izod impact strength is drastically increased.

As seen from the results obtained in Examples 14 through 16, if the components (G) and (H) are added to the components (A) through (D), a molded article having an excellent flame retardancy can be obtained.

As seen from the results obtained in Comparative Example 1, which are shown in Table 2, if the polyethylene terephthalate homopolymer is use as the base polymer $Tc^+$ is too high and the appearance is poor at a mold temperature of 80° C. As seen from the results obtained in Comparative Example 2, if the glass fiber is incorporated in an excessive amount, extrusion becomes impossible.

As seen from the results obtained in Comparative Example 3, if the components (C) and (D) are not incorporated, the surface appearance is degraded. As seen from the results obtained in Comparative Examples 4 through 6, if the component (C), (D) or (E) is incorporated in an excessive amount, the strength is drastically degraded.

As seen from the results obtained in Comparative Example 7, if the component (F) is incorporated in an excessive quantity, the flowability is degraded and extrusion becomes impossible. As seen from the results obtained in Comparative Examples 8 and 9, if the amount of the component (G) or (H) is small, the flame retardancy is poor.

As apparent from the foregoing description, if the specific nucleating agent (C), the specific crystallization-promoting agent (D) and, optionally, the specific inorganic compound (E), the specific impact strength improver (F) and/or the specific flame retardant (G) and specific flame retardant assistant (H), are incorporated into the specific polyethylene terephthalate copolymer (A) reinforced with the fibrous reinforcer (B) according to the present invention, a polyethylene terephthalate resin composition can be obtained which can give a molded article having an excellent surface appearance even at a mold temperature of 80° C., and having a high impact strength and a high flame retardancy.

We claim:

1. A polyethylene terephthalate resin composition comprising:
   (A) 100 parts by weight of a polyethylene terephthalate copolymer comprising ethylene terephthalate units as the main recurring units, said copolymer being formed by copolymerizing a carboxylic acid component containing primarily terephthalic acid with a glycol component containing from 1 to 20% by weight, based on the weight of the copolymer, of a polyalkylene glycol having an average molecular weight of 500 to 20,000 and from 1.2 to 15% by weight, based on the weight of the copolymer, of diethylene glycol;
   (B) from 5 to 200 parts by weight of a fibrous reinforcer;
   (C) from 0.5 to 130 parts by weight of a nucleating agent; and
   (D) from 0.1 to 60 parts by weight of a crystallization-promoting agent.

2. A polyethylene terephthalate resin composition as set forth in claim 1, wherein the nucleating agent is at least one member selected from the group consisting of talc and sodium and potassium salts of olefin/acrylic acid copolymers and olefin/methacrylic acid copolymers.

3. A polyethylene terephthalate resin composition as set forth in claim 1, wherein the crystallization-promoting agent is at least one member selected from the group consisting of ether compounds represented by the following formula [I]:

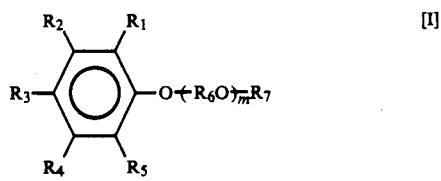

wherein $R_1$ through $R_5$ independently represent a hydrogen or a hydrocarbon group, $R_6$ represents an alkylene group having 2 to 6 carbon atoms, $R_7$ represents a hydrogen atom or a hydrocarbon group containing a benzene ring and having 6 to 12 carbon atoms, and m is an average repetition number which is in the range of from 20 to 150, and polyester elastomers.

4. A polyethylene terephthalate resin composition as set forth in claim 1, which further comprises 2 to 100 parts by weight of an inorganic compound.

5. A polyethylene terephthalate resin composition as set forth in claim 4, wherein the inorganic compound is at least one member selected from the group consisting of wollastonite, mica, silicic acid, silicic acid salts and calcium carbonate.

6. A polyethylene terephthalate resin composition as set forth in claim 1, which further comprises 2 to 100 parts by weight of an impact strength improver.

7. A polyethylene terephthalate resin composition as set forth in claim 6, wherein the impact strength improver is selected from the group consisting of (i) polystyrene resins containing a diene resin, (ii) copolymers comprising 70 to 99.5% by weight of an α-olefin, 2 to 20% by weight of glycidyl methacrylate and up to 30% by weight of vinyl acetate, and (iii) unsaturated acid-modified polyolefins.

8. A polyethylene terephthalate resin composition as set forth in claim 1, which further comprises 2 to 40 parts by weight of a flame retardant and 1 to 20 parts by weight of a flame retardant assistant.

9. A polyethylene terephthalate resin composition as set forth in claim 8, wherein the flame retardant is a polymeric bromine-containing flame retardant.

10. A polyethylene terephthalate resin composition as set forth in claim 8, wherein the flame retardant assistant is an antimony compound.

11. A polyethylene terephthalate resin composition as set forth in claim 8, wherein the flame retardant is at least one member selected from the group consisting of poly(2,4,6-tribromo)styrene, brominated crosslinked polystyrene and pentabromobenzyl polyacrylate.

12. A polyethylene terephthalate resin composition as set forth in claim 8, wherein the flame retardant assistant is at least one member selected from the group consisting of antimony trioxide, antimony pentoxide and sodium antimonate.

* * * * *